United States Patent
Cipriani et al.

(10) Patent No.: US 12,320,628 B2
(45) Date of Patent: Jun. 3, 2025

(54) METHOD AND APPARATUS FOR DETERMINING THE POSITION OF OBJECTS ON A CONVEYOR

(71) Applicant: FT SYSTEM SRL, Alseno (IT)

(72) Inventors: Marco Cipriani, Alpignano (IT); Michele Paglia, Parma (IT); Eric Orso, Perosa Argentina (IT)

(73) Assignee: FT SYSTEM SRL, Alseno (IT)

( * ) Notice: Subject to any disclaimer, the term of this patent is extended or adjusted under 35 U.S.C. 154(b) by 591 days.

(21) Appl. No.: 17/312,628

(22) PCT Filed: Dec. 12, 2019

(86) PCT No.: PCT/IB2019/060694
§ 371 (c)(1),
(2) Date: Jun. 10, 2021

(87) PCT Pub. No.: WO2020/121235
PCT Pub. Date: Jun. 18, 2020

(65) Prior Publication Data
US 2022/0074734 A1    Mar. 10, 2022

(30) Foreign Application Priority Data

Dec. 12, 2018  (IT) .................. 102018000011042

(51) Int. Cl.
  *G01B 11/24*   (2006.01)
  *G01B 11/02*   (2006.01)
  *G01B 11/06*   (2006.01)
(52) U.S. Cl.
  CPC ........ *G01B 11/028* (2013.01); *G01B 11/0608* (2013.01); *G01B 11/2433* (2013.01)
(58) Field of Classification Search
  CPC .............. G01B 11/028; G01B 11/0608; G01B 11/2433

(Continued)

(56) References Cited

U.S. PATENT DOCUMENTS 3,089,594 A * 5/1963 Early .................. G01B 11/245
                                                      209/525
4,105,925 A   8/1978 Rossol et al.
(Continued)

FOREIGN PATENT DOCUMENTS

CA    2099959 A1   1/1994
DE   19710913 A1   9/1998

OTHER PUBLICATIONS

International Search Report and Written Opinion of the International Searching Authority issued for International PCT Application No. PCT/IB2019/060694 on Mar. 30, 2020.

*Primary Examiner* — Isiaka O Akanbi
(74) *Attorney, Agent, or Firm* — Howson & Howson LLP (57) ABSTRACT

There is provided an apparatus for determining the position of objects (2) advancing in line on a supporting plane belonging to a transport line (1). The apparatus includes, for determining the position of an object (2) on the supporting plane, sources (22A, 23A) of a first and a second light beam (220, 230) generating collimated beams (220, 230) with substantial point-like cross-sectional size, which propagate along paths defining a plane parallel to the supporting plane and forming acute angles with the advance direction (F), and detectors (22B, 23B) for the separate detection of the first and the second beam (220, 230). A processing unit (12) includes means for comparing the instants at which an object passes through each beam (220, 230) and for detecting, based on the comparison result, a possible offset of the position of the object (2) from a reference position.

9 Claims, 4 Drawing Sheets

(58) Field of Classification Search
USPC .......................................................... 356/623
See application file for complete search history.

(56) References Cited

U.S. PATENT DOCUMENTS

| | | | | |
|---|---|---|---|---|
| 4,213,042 | A * | 7/1980 | Beach | G01N 21/9054 |
| | | | | 209/526 |
| 4,411,522 | A * | 10/1983 | O'Connor | G01N 21/8851 |
| | | | | 250/223 B |
| 4,494,656 | A | 1/1985 | Shay et al. | |
| 4,500,203 | A * | 2/1985 | Bieringer | G01N 21/9036 |
| | | | | 356/394 |
| 4,553,217 | A * | 11/1985 | Daudt | G01B 11/245 |
| | | | | 356/639 |
| 4,691,231 | A * | 9/1987 | Fitzmorris | G01N 21/9036 |
| | | | | 209/939 |
| 4,751,386 | A * | 6/1988 | Gardner | G01B 11/26 |
| | | | | 209/524 |
| 5,979,635 | A | 11/1999 | Calhoun | |
| 7,545,519 | B2 * | 6/2009 | Ossman | G01B 11/16 |
| | | | | 356/625 |
| 8,342,925 | B2 * | 1/2013 | Martin | A63B 67/14 |
| | | | | 463/2 |
| 2007/0153647 | A1 | 7/2007 | Maeda et al. | |
| 2011/0157604 | A1 * | 6/2011 | Wyble | G03G 15/65 |
| | | | | 356/621 |
| 2011/0196650 | A1 * | 8/2011 | Yang | G01B 11/0608 |
| | | | | 702/166 |
| 2013/0229643 | A1 | 9/2013 | Moeller | |

* cited by examiner

METHOD AND APPARATUS FOR DETERMINING THE POSITION OF OBJECTS ON A CONVEYOR

TECHNICAL FIELD

This invention concerns a method of and an apparatus for determining the position of objects conveyed on a transport line, more particularly a transport line moving at high speed. Preferably, but not exclusively, the present invention is applied in the field of object packaging and, in the most preferred application, the objects are bottles conveyed on a conveyor in a bottling installation towards a manipulating robot.

For the sake of clarity and simplicity of the description, hereinafter reference will mainly be made to that most preferred application.

PRIOR ART

In the field of object packaging, installations are widespread in which the objects to be packaged are arranged in line along a transport line comprising one or more conveyors moving through a succession of working stations, in which said objects are submitted to the different operations required for their packaging.

For instance, in case of bottling installations, the conveyor passes through a succession of working stations, including for instance a filling station, a capping station, a labelling station and so on. In some working stations the objects are to be picked from the conveyor in order to be submitted to the operations provided for, and, in highly automated systems, it is usual to use to this end a robot, e.g. an anthropomorphic robot.

In order the bottles can be seized by the robot, their position in the three directions must fall within a rather narrow tolerance range, e.g. ±2 mm. Yet, the bottles can have different heights (e.g. because some of them lack the cap or the cap is not wholly inserted or screwed, etc.), and the imperfect planarity of the bottle bottom as well as the bottle movements on the conveyor may cause misalignments of the bottles. Further, due to irregularities in the conveyor advance, it is possible that the bottles do not follow one another at regular cadence. All such irregularities may readily have an extent exceeding the tolerance limits provided for, and hence, in order to achieve a good productivity of the installations, the latter are equipped with apparatuses correcting the relative position of the robot and a bottle and ensuring that all, or almost all bottles to be submitted to working in that station can be picked by the robot.

A number of systems capable of detecting the position of objects conveyed on a conveyor are known in the art.

The most commonly employed systems make use of a vision system, such as a high-speed camera. Supplementing a production line with a vision system compels to solve a number of problems related to object illumination, calibration of the vision system, detection accuracy etc. Moreover, in case of high-speed production lines such as the ones of interest for the invention, it is difficult to meet with such systems the stringent limits imposed by the line as far as the shot speed of the camera, the illumination times and the response times of the correction system (which typically must be <20 ms) are concerned. Further, vision systems are expensive.

Other systems are based on the detection of the passage of the objects in front of one or more light sources.

U.S. Pat. No. 4,105,925 discloses a system comprising two light sources sending towards the conveyor diverging planar beams intersecting at a single transverse line on the conveyor. A diode array detects the light of said line. An object crossing the line intercepts the light beams, so that light lines are formed on the object at positions preceding or following the intersection line. The diode array detects therefore only the line segments beyond the object boundaries, thereby enabling determining the shape and the orientation of the object. The system provides information, including the coordinates x, y (average, maximum and minimum coordinates) of the object, to a mechanical arm for object manipulation.

The above mentioned system, providing for the sources sending beams onto the conveyor, entails the problem of choosing and/or correcting parameters depending on different conveyor typologies.

U.S. Pat. No. 4,494,656 discloses an apparatus for inspection of objects (bottles) moving on a conveyor. The apparatus includes a light sensor (including e.g. a laser) for detecting the presence or absence of an object at a certain height close to the conveyor surface. The apparatus detects the time elapsing between successive transitions (rising/falling edges) of the output signal of the light sensor, compares such time with threshold values and, based on such a comparison, detects stuck or down objects to be removed.

The above mentioned system does not allow determining the exact positions of the objects on the conveyor, but it only allows determining whether the objects are stuck or down.

DESCRIPTION OF THE INVENTION

It is a first object of the present invention to provide a system for determining the position of objects conveyed on a transport line, obviating the drawbacks of the prior art.

It is another object of the invention to provide a system for determining the position of objects conveyed on a transport line towards a manipulating robot, allowing a better reliability and a greater flexibility in the robot operation.

The above and other objects are achieved by a method and an apparatus as claimed in the appended claims.

In the method according to the invention, the position of the objects on a supporting plane, in particular in transverse direction to the advance direction, is determined by detecting the passage of the objects through a first and a second light beam crossing each other. The light beams are collimated beams with substantially point-like cross-sectional size, which propagate along paths defining a plane parallel to a plane supporting the objects and forming acute angles with the advance direction. A possible offset of the position of an object from a reference position is detected by comparing the instants at which the object passes through each beam.

Advantageously, the position of the objects in a direction perpendicular to the supporting plane is also determined. To this end, the passage of the objects through a third light beam is detected, which beam is a planar beam lying in a plane perpendicular to the supporting plane, propagating parallel to the supporting plane and transversely to the advance direction and arranged at a height relative to the supporting plane such that it is intercepted by the top part of the objects, and the vertical extent of the portion of the third beam intercepted by an object is determined. A possible offset of the position of the object from a reference position is detected by comparing the vertical extent of the beam portion intercepted by an object under inspection with that intercepted by an object located in the reference position.

An apparatus for implementing the method includes:
a unit for determining the position of an object on the supporting plane, in particular in transverse direction to the advance direction, in turn including a pair of sources of a first and a second light beam, which sources generate collimated beams with substantially point-like cross-sectional size, which propagate along paths defining a plane parallel to the supporting plane and forming acute angles with the advance direction, and a pair of detectors for the separate detection of the first and the second beam; and
a unit for detecting and correcting a possible offset of the position of the object from a reference position, which is arranged to compare the instants at which an object passes through each beam and to detect a possible offset based on the comparison result.

Advantageously, the apparatus further includes a unit for determining the position of the objects in a direction perpendicular to the supporting plane, including:
a source of a third light beam, which generates a planar beam lying in a plane perpendicular to the supporting plane and propagating parallel to the supporting plane and transversely to the advance direction, the source being arranged at such a height relative to said supporting plane that the third beam is intercepted by the top part of the objects; and
a receiver of said third beam, connected to the unit for detecting and correcting a possible offset;
and the unit for detecting and correcting the offset is arranged to determine the vertical extent of the portion of the third beam intercepted by an object and to detect the offset by comparing the vertical extent of the portion of said third beam intercepted by an object under inspection with that intercepted by an object located in the reference position.

The invention also concerns an installation for transporting objects advancing in line on a supporting plane towards a device for their manipulation, the installation comprising an apparatus according to the invention for: determining the position of the objects on the supporting plane, in particular in transverse direction to the advance direction and possibly in a direction perpendicular to the supporting plane; detecting a possible offset of the position of an object from a reference position that is optimal for the manipulation; and, in case of offset, supplying the manipulating device with signals for correcting its position.

Using laser sensors, in particular a pair of laser photocells for determining the position of an object on the supporting plane and a laser blade sensor for determining the position in the vertical plane, and determining the position by detecting the passage of an object through the sensor beams, allow determining and correcting the offsets with the sensitivity, rapidity and precision demanded in a high-speed production line. In this manner the reliability of the robot operation is increased, and also the seizing tolerances are improved, since the invention allows correcting also offsets falling within the tolerance range. Moreover, laser-based systems are simpler and quicker to install than vision systems.

BRIEF DESCRIPTION OF THE FIGURES

The above and other features and advantages of the present invention will become more apparent from the following description of a preferred embodiment made by way of non-limiting example with reference to the accompanying Figures, in which.

DESCRIPTION OF A PREFERRED EMBODIMENT

Figures 1, 2:
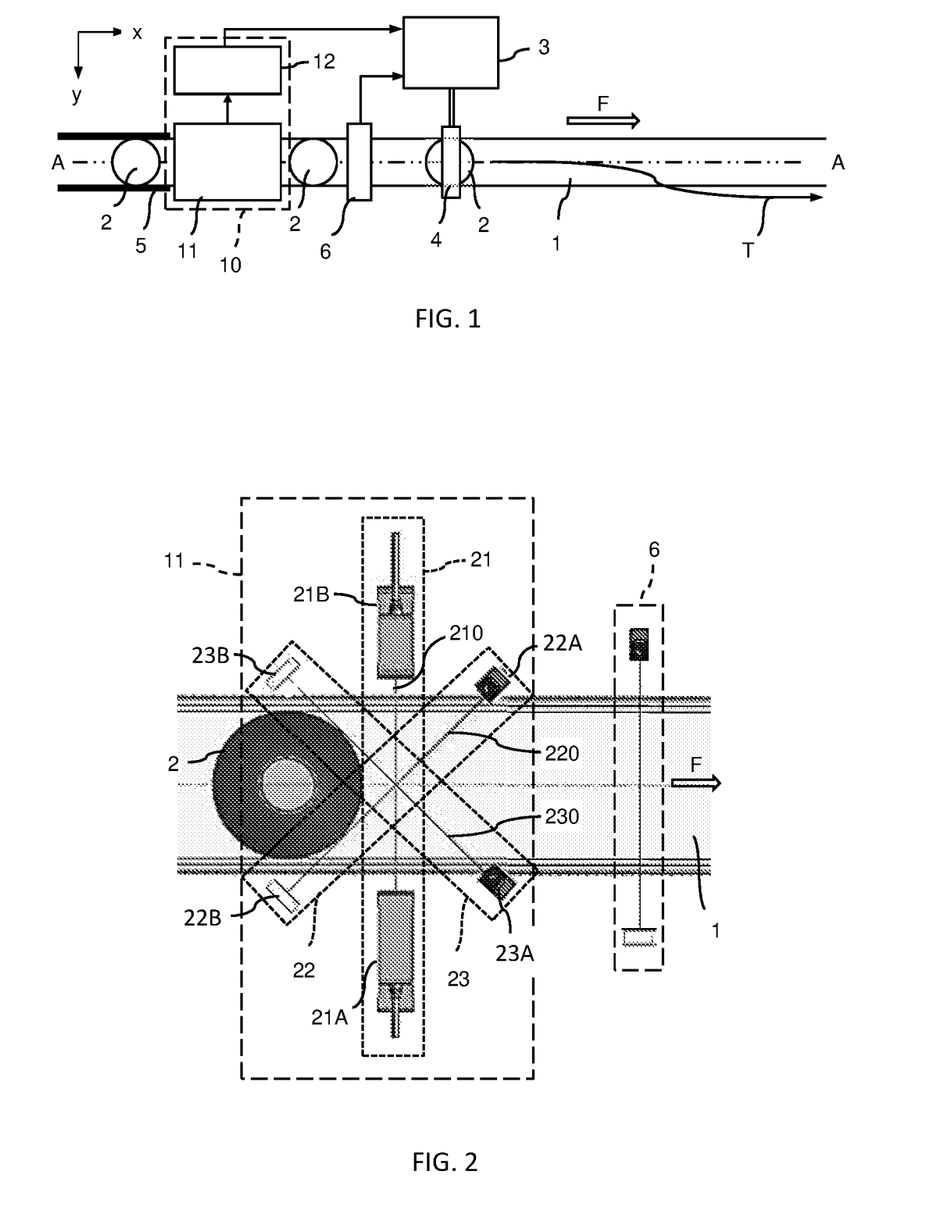
FIG. 1 is a basic scheme of a robotised installation for manipulating bottles conveyed by a conveyor, equipped with the apparatus according to the invention.
FIG. 2 is a schematic plan view of the portion of the installation including the apparatus according to the invention.

Referring to FIG. 1, reference numeral 1 denotes a conveyor advancing in the direction shown by arrow F and conveying a succession of objects 2, in the example considered bottles, towards a manipulating robot 3 having a seizing head 4 for seizing bottles 2. Conveyor 1 is a high-speed conveyor, typically moving at a speed of the order of 100 m/min, and it is associated over part of its path with guides 5 intended to keep in position and stabilise bottles 2 while they are advancing. Dashed-and-dotted line A-A shows the longitudinal axis of conveyor 1. Robot 3 is for instance to pick a bottle 2 from conveyor 1, insert at its place a bottle to be brought towards a working station located downstream along the conveyor, and bring the picked bottle to a position outside conveyor 1 by following a trajectory T. Robot 3 is for instance an anthropomorphic robot moving in the three orthogonal directions x (longitudinal coordinate parallel to advance direction F), y (transverse coordinate perpendicular to direction x in the conveyor plane) and z (vertical coordinate perpendicular to the conveyor plane). Robot 3 operates in an intervention region, which is located downstream of guides 5 and the beginning of which is set by a device 6, e.g. a photoelectric cell device (see FIGS. 2, 3), which detects the passage of a bottle 2 and consequently actuates the same robot.

In order bottles 2 can be seized by head 4 of robot 3, their position in the three directions x, y, z must fall within a predetermined and rather limited tolerance interval (e.g. ±2 mm). According to the invention, in order to correct vertical and horizontal offsets of bottles 2 from a reference position that is optimal in order a bottle 2 is seized by robot 3, an apparatus 10 (hereinafter referred to as correcting apparatus) is provided upstream of actuating device 6. Said apparatus detects the position of bottles 2 in the three directions x, y, z, determines a possible offset from the reference position and, if necessary, commands a displacement of robot 3 such as to compensate that offset. Apparatus 10 is substantially located at the end of guides 5, upstream of actuating device 6. The distance between apparatus 10 and actuating device 6 must be sufficient to allow acquiring the position of a bottle 2 and calculating and transmitting the corrections, if any, to robot 3 before the latter seizes bottle 2, and, at the same time, sufficiently short to ensure the validity of the calculated correction. For instance, apparatus 10 must provide the correction signal within a latency time shorter than few tens of milliseconds, typically shorter than 20 ms.

Correcting apparatus 10 comprises a unit 11 for determining the positions of bottles 2 and a unit 12 for determining the possible offsets from the reference position and the corrections to be imparted to robot 3. Unit 11 in turn comprises two separate and independent parts determining the vertical position (coordinate z) and the horizontal position, in particular in transverse direction (coordinate y), respectively, of a bottle.

Figure 3:
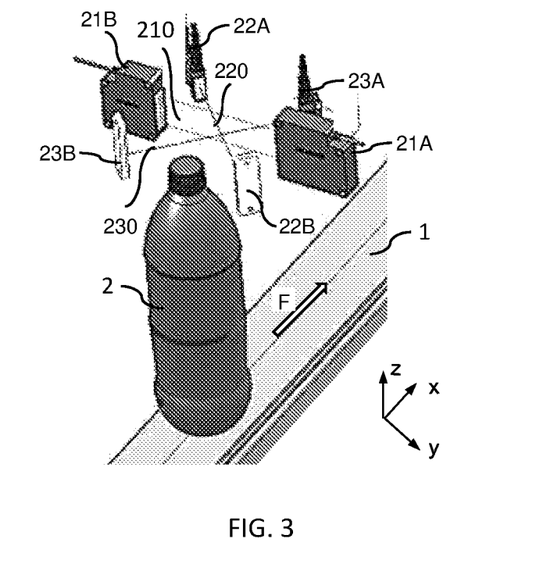
FIG. 3 is a perspective view of the portion of the installation depicted in FIG. 2.

Referring to FIGS. 2 and 3, the part determining coordinate z consists of a laser blade sensor 21, which comprises a source 21A and a detector 21B and emits a planar beam (blade) 210 extending in a plane perpendicular to the supporting plane, for instance in vertical plane z-y, and propagating in direction y parallel to the supporting plane. Sensor 21 is arranged at a distance from the surface of conveyor 1 such that beam 210 is intercepted by bottles 2 substantially at the top of their cap. Given a certain type of bottles, the position and the extension of laser blade 210 in plane z-y must be such that the blade is in any case intercepted also by bottles whose height is lower than the nominal height (e.g. bottles without cap). Preferably, also interception by bottles whose height exceeds the nominal height (e.g. bottles with a badly screwed or badly inserted cap) is partial. The determination of the position and the correction are based on the determination of the vertical extent of the portion of blade 210 being intercepted, and hence on the processing of an output signal of sensor 21, as it will be explained in more detail hereinafter. The output signal of sensor 21 will be sampled at a sampling rate sufficiently high to provide, for a given bottle, a minimum number of samples such as to allow compensating shape aberrations. For instance, given the conveyor speed indicated above, such a requirement will be met by a sampling time of the order of 1 ms.

The part determining coordinate y consists instead of two high-speed laser photocells 22, 23, laser beams 220, 230 of which propagate in a plane parallel to plane x-y according to paths forming acute angles with the advance direction of conveyor 1, and hence with axis A-A. Reference numerals 22A, 23A and 22B, 23B denote the sources and the detectors, respectively, of photocells 22, 23. Also the plane defined by beams 220, 230 may be located in correspondence of the region of the bottle caps, but this is not essential. Advantageously, both beams 220, 230 are arranged at a same angle relative to axis A-A, so that they cross each other in correspondence of the projection of that axis on the propagation plane. Preferably, that angle is 45°: Such an angle has proven to allow the best resolution sensitivity and to minimise the overall size.

The determination and the correction of coordinate y are based on the detection of the passage of the bottle in front of photocells 22, 23 and on the measurement of the possible difference between the instants at which such a passage occurs, as it will be explained in more detail hereinafter. Unit 12 calculating the possible corrections is such as to allow very fine resolutions in determining the difference mentioned above, e.g. resolutions of the order of 100 μs in case of the conveyor speed indicated above. Use of laser photocells allows generating radiations in well collimated beams, with a very narrow cone (beams with a substantially point-like cross-sectional size), so that the error in the detection of the bottle passage is minimised.

A device for actuating apparatus 10 (in particular position determining unit 11), not shown, e.g. a device similar to device 6 for actuating the robot, may be provided upstream of apparatus 10 in order to relate the correction to the bottle.

Such a device is used by the bottle tracking system, which, as usual in such installations, evaluates, based on the operation specifications of the particular installation, whether or not a bottle arriving at the manipulating station where robot 3 is installed is to be manipulated and hence whether or not the correctness of its position is to be checked.

For the sake of simplicity of the drawing, support structure for unit 11 of apparatus 10 has not been shown. Such a structure is to be fixedly connected to conveyor 1 and will be coupled therewith so as to be as far as possible free of the vibrations introduced by the same conveyor, in order dynamic stability of the measurement can be ensured.

Moreover, unit 11 must have various mechanical regulations for calibrating the system and compensating positioning and alignment errors. More particularly, such regulations must ensure the desired accuracy for the inclination of photocells 22, 23. Moreover, unit 11 must be adjustable in height to adapt the position of laser blade sensor 21 to the different formats of a multi-format production line.

Figure 4:
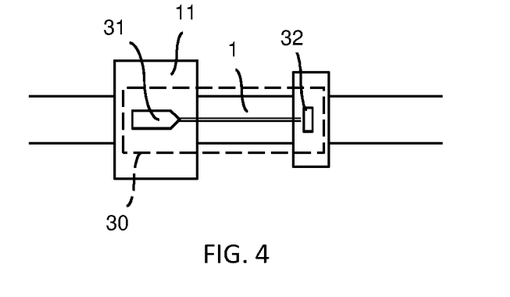
FIG. 4 is a basic scheme of a system for the initial alignment of the apparatus according to the invention.

Alignment of unit 11 relative to conveyor 1, necessary to achieve the required measurement accuracy, can be achieved in an installation step by means of a system 30 temporarily associated with unit 11 and conveyor 1 in that step. For instance, as shown in FIG. 4, such a system includes a laser pointer 31 mounted on unit 11 and intended to illuminate a target 32 located on conveyor 1. In the alternative, target 32 can be associated with unit 11 and pointer 31 with conveyor 1. The operating manner of systems of this kind is well known to the skilled in the art. Preferably, both pointer 31 and target 32 are installed only during the alignment step, even though the element associated with unit 11 could be permanently installed.

A possible exemplary embodiment of the method according to the invention will now be described. The corrections calculated by unit 12 are relative corrections, i.e. a null value indicates that a bottle is in the reference position and a non-null value indicates the extent and the sign of the displacement to be imparted to robot 3 in order to move it to the position suitable to pick the bottle.

Figure 5:
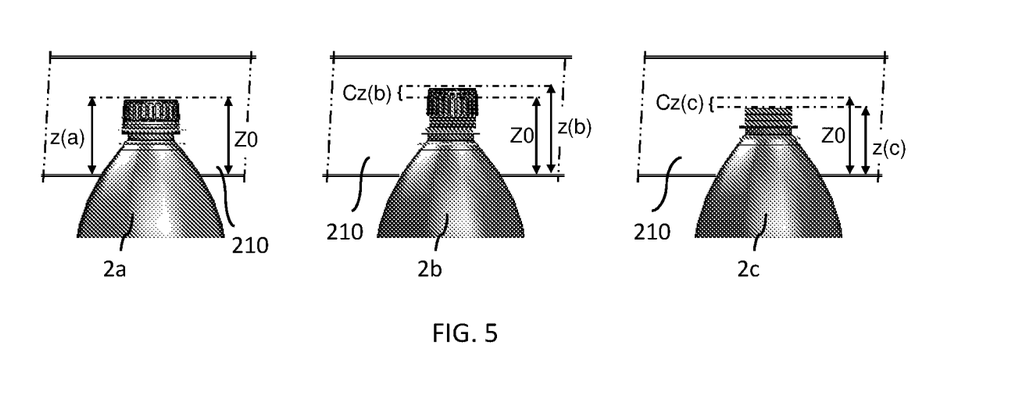
FIG. 5 is a basic diagram of the vertical correction.
Figure 6:
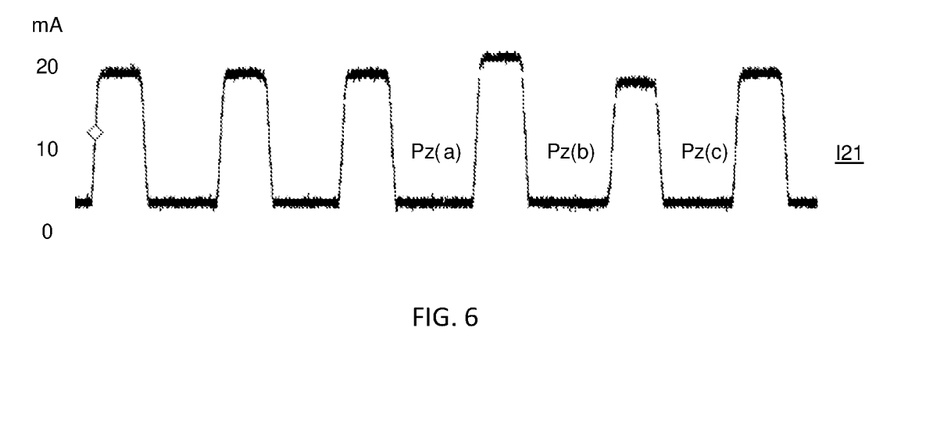
FIG. 6 shows a signal used for the vertical correction.

As far as the correction of coordinate z is concerned, reference is made to FIGS. 5 and 6. As said, such a correction is based on the determination of the vertical extent of the beam portion intercepted by a bottle 2 and on the comparison with the extent intercepted by a bottle located in the reference position (or, equivalently, having an envisaged nominal height).

FIG. 5 shows three bottles 2a, 2b, 2c (e.g. with a screw cap) and their positions relative to laser blade 210. For instance, bottle 2a has the envisaged nominal height (correctly screwed cap) and thus is in the reference vertical position, bottle 2b has a height greater than the nominal one (partly unscrewed cap) and bottle 2c has a height smaller than the nominal one (missing cap).

FIG. 6 shows the output signal of sensor 21, assuming, by way of example only and for the sake of clarity of the description, that such a signal is a current signal which is at a minimum level (e.g. 4 mA) when beam 210 arrives at detector 21B without being intercepted, and at a maximum level (e.g. 20 mA) when beam 210 is fully intercepted. As it is clearly apparent for the skilled in the art, such a signal consists of a train of pulses, originated each by the interception of beam 210 by a bottle 2, the (negative) peak level of which clearly depends on the vertical extent of the portion of beam 210 intercepted by a bottle 2, and hence on the bottle height. Pulses Pz(a), Pz(b), Pz(c) correspond to the passage of bottles 2a, 2b, 2c, respectively. For the sake of simplicity of the drawing, the sampling of the output signal of sensor 21 while a bottle is passing has not been shown.

In this exemplary embodiment, let it be:

Iz(i) (mA) the output current of sensor 21 at the passage of the i-th bottle (i=a, b, c);

K (mm/mA) the conversion constant of sensor 21, given e.g. by relation $$K=\Delta/(Imax-Imin),$$

where $\Delta$ is the height range that can be detected by the sensor and Imax, Imin are the maximum and minimum currents, z(a), z(b), z(c) the quotes of the caps of bottles 2a, 2b, 2c relative to the bottom edge of beam 210, and Z0 the value complementary to the quote corresponding to the reference position (i.e. the value of the distance of the bottom edge of beam 210 from the top of the cap of a bottle having the nominal height).

Then, coordinate z of the i-th bottle will be Iz(i)*K, and correction Cz(i), if any, to be applied to robot 3 will be $$Cz(i)=Iz(i)*K+Z \quad (1).$$

For bottle 2a, it is evident that current Iz(a) will be such that Iz(a)*K=−Z0, so that Cz(a)=0. For bottles 2b, 2c, conditions Iz(b)<Iz(a) and Iz(c)>Iz(a), respectively, will occur, and consequently Cz(b) will have a positive value and Cz(c) a negative value, so that head 4 will have to be lifted or lowered, respectively, in order to be moved to the seizing position.

It is evident that the same principle can be applied when the output signals of sensor 21 are voltage signals having a positive maximum level when beam 210 arrives at detector 21B without being intercepted and a substantially 0 level when beam 210 is fully intercepted.

As far as the correction of coordinate y is concerned, as said, the passage of a bottle through beams 220, 230 is detected and, more particularly, the difference between the instants of arrival of a bottle 2 at those beams is measured.

Figure 7:
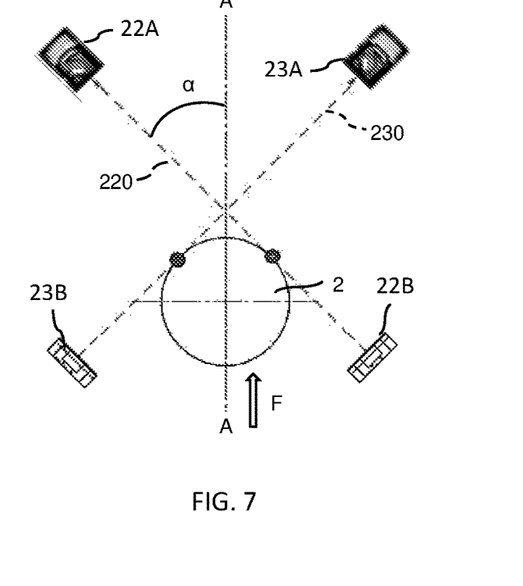
FIGS. 7 and 8 are diagrams illustrating the transverse correction.
Figure 8:
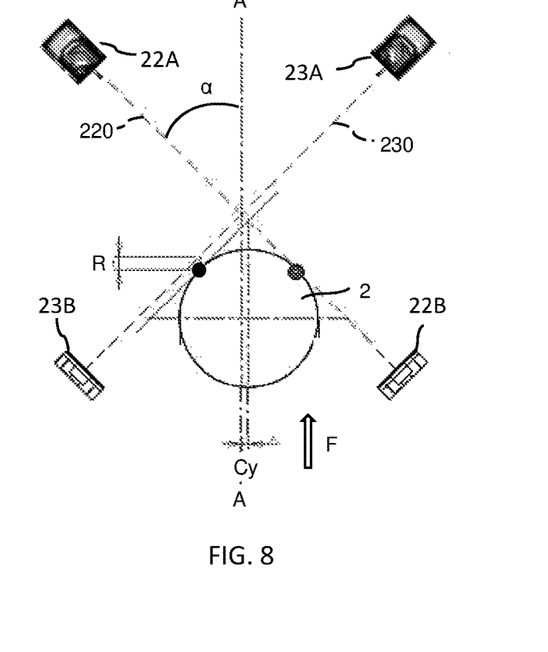
Figure 9:
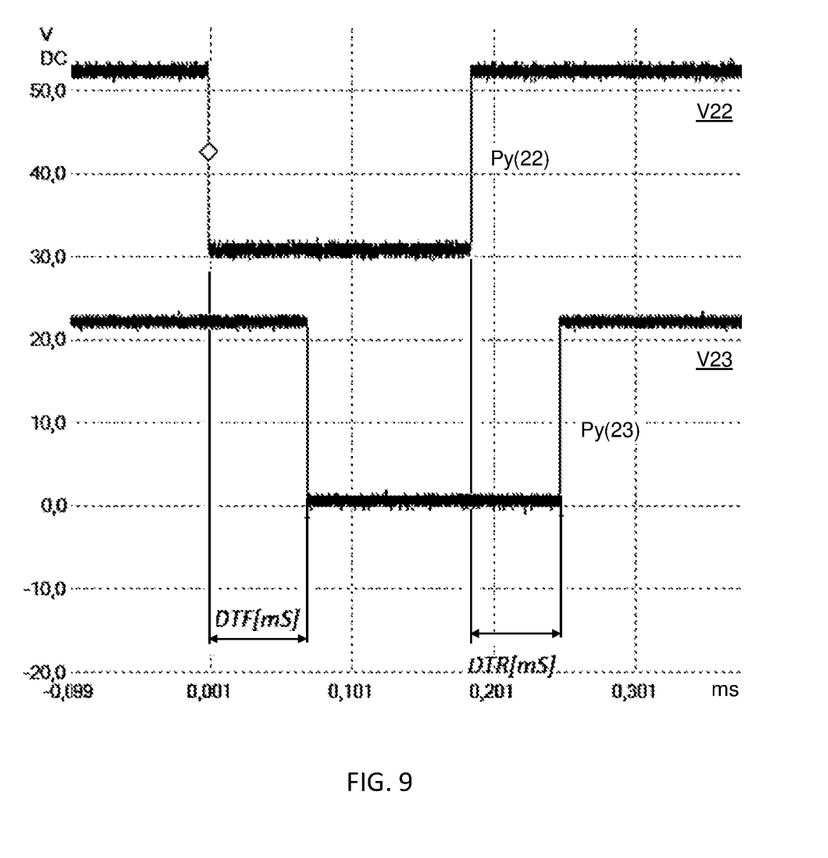
FIG. 9 shows the signals used for the transverse correction.

Reference is made to FIGS. 7 and 8, which show the arrival at beams 220, 230 of a bottle centred on axis A-A of conveyor 1 and of a bottle out of alignment relative to such an axis, respectively, and to FIG. 9 showing the output signals of photocells 22, 23 in the situation shown in FIG. 8.

Having assumed that the beams are arranged at the same angle relative to axis A-A (45° in FIGS. 7, 8), a bottle centred on the axis arrives at the same instant at beams 220, 230, as shown in FIG. 7. If on the contrary the bottle is offset from the axis, one beam will be intercepted before the other. FIG. 8 shows an offset to the right, so that bottle 2 first intercepts beam 220 and then beam 230.

Referring to FIG. 9, it is assumed that photocells 22, 23 provide voltage signals V22, V23 that, as it is clearly apparent for the skilled in the art, consist of a train of negative pulses (of which only one, denoted Py(22) and Py(23), respectively, is shown in the Figure), corresponding each to the interception of beam 220, 230 by a bottle 2. The falling and rising edges of the negative pulses of V22, V23 correspond to bottle 2 entering and leaving, respectively, the corresponding beam. Also signals V22, V23 are assumed to have a certain positive voltage (e.g. 24 V) when beams 220, 230 are not intercepted, and a substantially null voltage when beams 220, 230 are intercepted by a bottle 2.

Let it be:

Cy (mm) the offset of the bottle from axis A-A of the conveyor (and hence the extent of the correction to be applied to coordinate y of the robot);

R (mm) the distance, along bottle advance direction F, between the actual entry point of the bottle into beam 230 and the theoretical entry point (i.e. the entry point if the bottle was centred on the axis);

DTF (ms) the delay of the falling edge of pulse Py(22) relative to that of Py(23);

v(x) (m/s) the advance speed of the conveyor;

α the angle of beams 220, 230 with conveyor axis A-A.

Then, by simple trigonometric considerations, there is obtained, for an angle α=45° as shown in FIGS. 7 and 8

$$Cy=R/2 \quad (2)$$

and, for a generic angle α

$$Cy=R/2*\tan g\alpha \quad (3)$$

Being obviously R=v(x)*DTF, correction Cy(f) calculated by using the falling edges of pulses Py(22), Py(23) is given by $$Cy(f)=v(x)*DTF/2 \quad (4)$$

$$Cy(f)=v(x)*DTF*\tan g\alpha/2. \quad (5)$$

for angle α=45° and for a generic angle α, respectively.

Theoretically, using the falling edges of pulses Py(22), Py(23) is sufficient in order to correct the position in plane x-y. Yet, in practice, using the falling edges only renders the measurement sensitive to system misalignment errors and to differences in the divergence of beams 220, 230. In order to alleviate the problem, also the rising edges can be exploited. In this case, denoting by DTR the delay of the rising edge of pulse Py(23) relative to that of Py(22), correction Cy(r) calculated by using the rising edges is given by $$Cy(r)=v(x)*DTR/2 \quad (6)$$

$$Cy(r)=v(x)*DTR*\tan g\alpha/2. \quad (7)$$

for angle α=45° and for a generic angle α, respectively. The actual correction Cy can be for instance the average of values Cy(f) and Cy(r) or another combination of the same values. In the alternative, a correction factor, e.g. proportional to DTF−DTR, can be applied to value Cy(f).

By using both edges of the pulses, the measurement sensitivity to system misalignment errors and to differences in the beam divergence can be reduced by about one order of magnitude.

It is also pointed out that also the longitudinal position (coordinate x) of a bottle is detected from the instants of passage of a bottle 2 in front of photocells 22, 23. Yet, such an information item is not used, since coordinate x is usually calculated by robot 3 based on information that can be obtained from actuating device 6 and from the units controlling the movements of conveyor 1. For this reason, only the correction in transverse direction has been discussed here.

Figure 10:
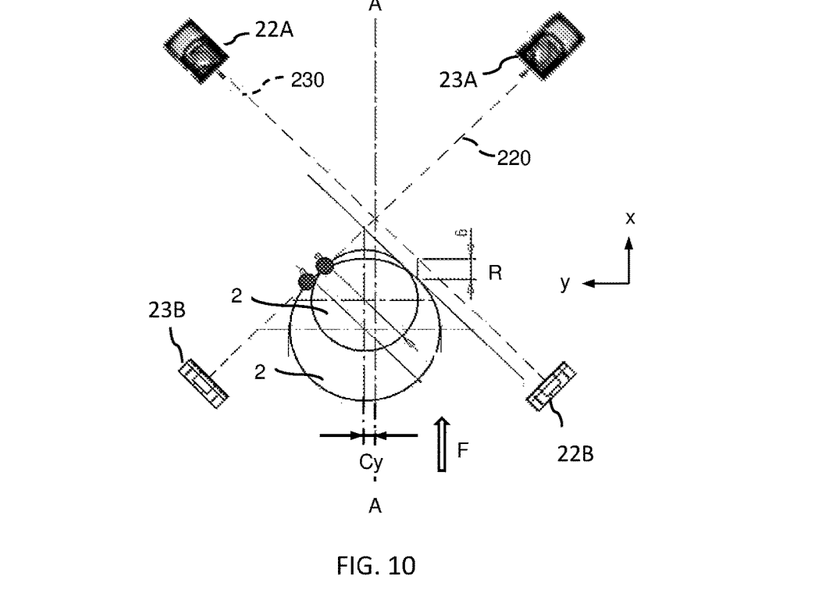
FIG. 10 is a diagram similar to FIGS. 7 and 8, showing the independence of the transverse correction from the diameter of the object.

Correction in plane x-y is independent from the diametrical coordinate, as shown in FIG. 10. If the diameter changes, the instant of interception of beams 220, 230 will change, but the relative time difference, which only depends on offset Cy, will not change. Thus, it does not matter whether beams 220, 230 are intercepted by the cap portion of bottles 2 or by another portion. For the same reason, in case of multi-format installations, it is not necessary to program again unit 12 when one starts operating with bottles of different diameters.

It is clear that the invention allows solving the problems of the prior art mentioned above. More particularly, as it can be deduced from the above relations concerning the adjustments, the system also allows correcting offsets falling within the tolerance ranges mentioned above.

It is clear that the above description has been given only by way of non-limiting example and that changes and modifications are possible without departing from the scope of the invention as defined in the appended claims.

More particularly, as far as the correction of coordinate y is concerned, when only one edge of the pulses of signals V22, V23 is used, such edge could be the rising edge instead of the falling edge, since, if beams 220, 230 are identical and perfectly collimated and the system is perfectly aligned, the same time relations exist for both the rising and the falling edges.

Moreover, instead of the mathematical relations given above by way of example, different functions of the level of the output signal of sensor 21 and of the nominal height of the bottles (as far as correction of coordinate z is concerned), or of the distance between the rising and/or falling edges of the pulses of the output signals of photocells 22, 23 (as far as correction of coordinate y is concerned) can be used for the corrections, such functions depending also on the geometrical parameters of the specific sensor/photocell and of the bottle.

Furthermore, as far as correction of coordinate z is concerned, even if such a coordinate has been interpreted as the quote of the top of a bottle relative to the bottom edge of beam 210, it is clear that, by suitably programming unit 12, apparatus 10 could directly provide the quote relative to the surface of conveyor 1.

The invention claimed is:

1. A method of determining the position of objects advancing in line on a supporting plane belonging to a transport line, the method comprising the steps of:
   determining the position of the objects on the supporting plane, in particular in transverse direction to the advance direction of the same objects, by detecting their passage through a first and a second light beam crossing each other, wherein said light beams are collimated beams with substantially point-like cross-sectional size, which propagate along paths defining a plane parallel to the supporting plane and forming acute angles with the advance direction,
   said determining step including detecting an offset of the position of an object from a reference position by comparing the instants at which the object passes through each beam,
   said step of detecting an offset including detecting both the instants at which the object enters the first and the second beam and the instants at which the object leaves the first and the second beam, and
   said determining step including obtaining the extent of the offset from a combination of the time difference between the instants of entry into each beam and the time difference between the instants of exit from each beam;
   the method further comprising a step of initial alignment of the beams relative to the advance direction, performed by using a light pointer and a target, one of which is temporarily associated with a position detecting unit and the other is temporarily associated with the transport line.

2. The method according to claim 1, wherein the position of the objects in a direction perpendicular to the supporting plane is also determined, by the steps of:
   detecting the passage of the objects through a third light beam, which is a planar beam lying in a plane perpendicular to the supporting plane, propagating parallel to the supporting plane and transversely to the advance direction and arranged at such a height relative to said supporting plane that it is intercepted by the top part of the objects; and
   determining the extent of the portion of the third beam intercepted by an object;
   and wherein a possible offset of the position of the object from a reference position is detected by comparing the extent of the portion of the third beam intercepted by an object under inspection with the extent of the portion intercepted by an object located in the reference position.

3. The method according to claim 1, wherein the first and the second beam form identical angles with the advance direction of the objects.

4. The method according to claim 3, wherein the position of the objects in a direction perpendicular to the supporting plane is also determined, by the steps of:
   detecting the passage of the objects through a third light beam, which is a planar beam lying in a plane perpendicular to the supporting plane, propagating parallel to the supporting plane and transversely to the advance direction and arranged at such a height relative to said supporting plane that it is intercepted by the top part of the objects; and
   determining the extent of the portion of the third beam intercepted by an object;
   and wherein a possible offset of the position of the object from a reference position is detected by comparing the extent of the portion of the third beam intercepted by an object under inspection with the extent of the portion intercepted by an object located in the reference position.

5. Apparatus for determining the position of objects advancing in line on a supporting plane belonging to a transport line, including:
   an optical unit for determining the position of the objects on the supporting plane, in particular in transverse direction to the advance direction, said unit including sources of a first and a second light beam and means for detecting said beams, arranged to detect the passage of an object through the same beams; and
   a processing unit for processing the signals resulting from the detection;
   wherein said sources generate collimated beams with substantial point-like cross-sectional size, which propagate along paths defining a plane parallel to the supporting plane and forming acute angles with the advance direction;
   wherein said beam detecting means comprise a first and a second detector for the separate detection of the first and the second beam;
   wherein the processing unit includes means for comparing the instants at which an object passes through each beam and for detecting, based on the comparison result, an offset of the position of the object from a reference position; and
   wherein the comparison means are arranged to detect the offset from the reference position by comparing both the instants at which the object enters the first and the second beam and the instants at which the object leaves the first and the second beam and to determine the extent of the offset on the basis of a combination of the time difference between the instants of entry of the object into the first and the second beam and the time difference between the instants of exit of the object from the first and the second beam;

the apparatus further including a light pointer and a target, one of which is temporarily associated with a position detecting unit and the other is temporarily associated with the transport line, the pointer and target being configured to perform a step of initial alignment of the beams relative to the advance direction.

6. An installation for transporting objects, arranged in line on a supporting plane belonging to a transport line, towards a device for manipulating said objects, the installation comprising an apparatus according to claim 5 for: determining the position of the objects on the supporting plane, in particular in transverse direction to the advance direction, and possibly the position of the objects in a direction perpendicular to the supporting plane; detecting a possible offset of the position of an object from a reference position which is optimal for the manipulation; and, in case of offset, supplying the manipulating device with signals for correcting its position.

7. The apparatus according to claim 5, wherein the optical unit for determining the position of the objects further includes, for determining the position of the objects in a direction perpendicular to the supporting plane:
   a source of a third light beam, which generates a planar beam lying in a plane perpendicular to the supporting plane and propagating parallel to the supporting plane and transversely to the advance direction, the source being arranged at such a height relative to said supporting plane that the third beam is intercepted by the top part of the objects; and
   a detector of said third beam, connected to the processing unit;
   and wherein the processing unit is arranged to determine the extent of the portion of said third beam intercepted by an object, and the comparison means are arranged to detect a possible offset of the position of the object from the reference position by comparing the extent of the portion of said third beam intercepted by an object under inspection with the extent of the portion intercepted by an object located in the reference position.

8. The apparatus according to claim 5, wherein the sources of the first and the second beam are so arranged that the paths of said beams form identical angles with the advance direction of the objects.

9. The apparatus according to claim 8, wherein the optical unit for determining the position of the objects further includes, for determining the position of the objects in a direction perpendicular to the supporting plane:
   a source of a third light beam, which generates a planar beam lying in a plane perpendicular to the supporting plane and propagating parallel to the supporting plane and transversely to the advance direction, the source being arranged at such a height relative to said supporting plane that the third beam is intercepted by the top part of the objects; and
   a detector of said third beam, connected to the processing unit;
   and wherein the processing unit is arranged to determine the extent of the portion of said third beam intercepted by an object, and the comparison means are arranged to detect a possible offset of the position of the object from the reference position by comparing the extent of the portion of said third beam intercepted by an object under inspection with the extent of the portion intercepted by an object located in the reference position.

\* \* \* \* \*